United States Patent Office 3,057,849
Patented Oct. 9, 1962

3,057,849
CARBON, FLUORINE, AND NITROGEN CONTAINING COMPOUNDS AND METHOD FOR PRODUCING THE SAME
Charles W. Tullock, Wilmington, Del., assignor to E. I. du Pont de Nemours and Company, Wilmington, Del., a corporation of Delaware
No Drawing. Filed Dec. 5, 1958, Ser. No. 778,301
12 Claims. (Cl. 260—192)

This invention relates to new compounds of carbon, fluorine and nitrogen, and to a method for preparing them.

In spite of the great advances made in recent years in the chemistry of organic fluoro compounds, polyfluoroazoalkanes, i.e., the compounds of the formula R—N=N—R, where R is a highly fluorinated aliphatic radical, are virtually unknown. The sole reported example of this class of compounds is hexafluoroazomethane, $CF_3N=NCF_3$, which has been prepared by reaction of cyanogen halides with certain highly reactive fluorides such as iodine pentafluoride or silver bifluoride [Ruff and Willenberg, Ber. 73, 724 (1940); Glemser et al., Ger. Pat. 1,005,972]. No method has been reported which could lead to the higher polyfluoroazoalkanes, and these compounds have been heretofore unknown. Similarly, the N-halo(fluoroalkylidene)imines R—CF=N—Hal., and the N,N-dihalo(fluoroalkyl)amines R—$CF_2$—$N(Hal.)_2$, where R is a fluorinated aliphatic radical and Hal. is chlorine or bromine, have not been previously described.

This invention provides a process for preparing compounds containing carbon, fluorine and nitrogen which comprises maintaining in contact, at a temperature within the range of 25 to 250° C., (1) a polyfluoronitrile of the formula X—R—CN, where X is hydrogen or fluorine and R is a perfluoroalkylene radical (i.e., a saturated, divalent aliphatic radical consisting only of carbon and fluorine atoms); (2) a halogen of atomic number 17 to 35, i.e., chlorine or bromine; and (3) a fluoride of a metal of the class of group I metals having atomic numbers from 11 to 55, inclusive (i.e., sodium, potassium, rubidium, cesium, copper and silver), mercury and lead, until at least one of the following products has been formed: polyfluoroazoalkanes of the formula

X—R—$CF_2$—N=N—$CF_2$—R—X where R and X are as defined above, and N-halo(fluoroalkylidene)imines of the formula X—R—CF=N—Hal., where R and X are as defined above and Hal. represents chlorine or bromine. Under certain conditions (discussed later) there is also found, together with the above-mentioned products and generally in smaller amounts, an N,N-dihalo(fluoroalkyl)amine of the formula X—R—$CF_2$—$N(Hal.)_2$ where R and X are as defined above and Hal. represents chlorine or bromine.

The invention also provides, as new products, the polyfluoroazoalkanes of the general formula

X—R—$CF_2$—N=N—$CF_2$—R—X the N-halo(fluoroalkylidene)imines of the general formula X—R—CF=N—Hal.; and the N,N-dihalo(fluoroalkyl)amines of the general formula X—R—$CF_2$—$N(Hal.)_2$ In these formulas, X is hydrogen or fluorine; R is a perfluoroalkylene radical; and Hal. is chlorine or bromine.

The reactions which take place in this process may be represented by the following equations, using silver(I) fluoride and chlorine as the illustrative inorganic reactants:

(1) 2X—R—CN+$2Cl_2$+4AgF
  →X—R—$CF_2$—N=N—$CF_2$—R—X+4AgCl
(2) X—R—CN+$Cl_2$+AgF→X—R—CF=NCl+AgCl
(3) X—R—CN+$2Cl_2$+2AgF
  →X—R—$CF_2$—$NCl_2$+2AgCl

The organic starting materials for use in the process of this invention are the perfluoronitriles F—R—CN and the ω-hydroperfluoronitriles H—R—CN, wherein R is a divalent perfluoroalkyl radical containing only carbon and fluorine atoms. These polyfluoronitriles are prepared from the corresponding polyfluorocarboxylic acids, which are converted by conventional methods to the amides, the latter then being dehydrated, for example by treatment with phosphoric anhydride, to the nitriles. The ammonium salts of the acids can also be converted directly to the nitriles by heating them with phosphoric anhydride. The polyfluorocarboxylic acids themselves, and/or their amides or nitriles, have been reported in the literature. For example, U.S. Patent 2,559,629 describes the acids $H(CF_2CF_2)_nCOOH$. U.S. Patent 2,646,449 describes the preparation of the amides $H(CF_2)_nCONH_2$. U.S. Patent 2,567,011 describes the perfluorocarboxylic acids, their amides and nitriles. The amides of tetrahalopropionic acids, e.g., $HCF_2CF_2CONH_2$, can be prepared by the method described in U.S. Patent 2,802,028.

One of the inorganic reactants is chlorine or bromine, which can be used as commercially available without purification. Chlorine is usually preferred since it is cheaper and more reactive. The other inorganic reactant is a fluoride of a metal of group I of the periodic table having atomic weight from 11 to 55, i.e., sodium, potassium, copper, rubidium, silver and cesium, or a fluoride of mercury or lead. While all these fluorides are operable, the fluorides of potassium, cesium, silver and mercury are markedly more reactive than the others, and they are therefore preferred.

The reaction should be carried out under essentially anhydrous conditions, and therefore all reactants should be substantially anhydrous.

The relative proportions of the three reactants are not critical. They are important only to the extent that it is desirable to utilize as much of the polyfluoronitrile as possible. For this reason, there is generally used at least one mole, and preferably at least two moles, of the metallic fluoride per mole of polyfluoronitrile. It is unnecessary to use more than about ten moles of metallic fluoride per mole of polyfluoronitrile. When the molar ratio of the metallic fluoride to the polyfluoronitrile is of the order of 4:1 or higher, the main reaction product is the azopolyfluoroalkane, with little or no N-halo(fluoroalkylidene)-imine; as this molar ratio is decreased from 4:1 to 1:1 or less, the production of N-halo(fluoroalkylidene)imine in the reaction product increases. The elemental halogen (chlorine or bromine) is generally used in a molar ratio of halogen to polyfluoronitrile between about 0.5:1 and 2.5:1. Formation of the N,N-dihalo(fluoroalkyl)amine tends to increase in the higher portion of this range, e.g., when this ratio is between 1.5:1 and 2.5:1.

With the more active reactant systems, such as the system silver fluoride/chlorine, the reaction proceeds although slowly, at temperatures as low as 25° C. Preferably, the reactants are heated to at least 50° C., and with the less reactive fluorides such as potassium fluoride or lead fluoride, higher temperatures, e.g., 150° C. or above, are recommended. The elemental halogen used also has an influence on the choice of the reaction temperature. Since chlorine is more active than bromine it does not require as high a temperature. The reaction temperature should not exceed about 250° C. since, above that temperature, cleavage of the nitrogen-containing compounds by the elemental halogen present takes place to an undesirable extent, and the main reaction product is a chloro- or bromopolyfluoroalkane.

When it is desired to obtain appreciable amounts of the N,N-dihalo(fluoroalkyl)amine, it is recommended to use one of the more reactive fluorides, such as cesium or mercury fluorides, and especially silver fluoride, with chlorine as the halogen. Furthermore, the reaction temperature should not exceed about 150° C., and it is preferably in the range 50–100° C. Under such conditions, and especially if the halogen/polyfluoronitrile mole ratio is at least 1.5:1, the reaction product contains significant, though generally small, amounts of the N,N-dihalo(fluoroalkyl)amine in addition to the polyfluoroazoalkane and the N-halo(fluoroalkylidene)imines. Some of the examples which follow illustrate the preparation of several N,N-dihalo(fluoroalkyl)amines.

The reaction is conveniently carried out in corrosion-resistant pressure vessels under the autogenous pressure developed by the reactants at the reaction temperature. If desired, additional pressure provided by an inert gas such as nitrogen can be used, but this is not necessary. The examples which follow were carried out using pressure vessels constructed of the nickel-iron-molybdenum alloy known commercially as "Hastelloy" C. However, the process can also be carried out at or near atmospheric pressure by passing a gaseous mixture of the polyfluoronitrile and elemental halogen employed over the metal fluoride heated to the reaction temperature, and recycling as necessary. When operating in sealed vessels, appreciable conversions are achieved in reaction periods as short as 30 minutes at reaction temperatures appropriate for the metal fluoride employed, e.g., 50–75° C. or higher with silver fluoride, and correspondingly higher temperatures with the less reactive fluorides. In general, little or no further reaction takes place after 3–6 hours' contact at reaction temperature.

The reaction products can be separated from the reaction mass by removing the volatile materials (polyfluoroazoalkane, N-halo(fluoroalkylidene)imine, N,N-dihalo-(fluoroalkyl)amine, if any is formed under the conditions used, unchanged polyfluoronitrile and elemental halogen) from the inorganic salts (unchanged metal fluoride mixed with the corresponding metal chloride and bromide formed in the reaction) by evaporation. If necessary the volatile products may be removed under reduced pressure, and condensed in traps. The solid reaction products can also be extracted with an appropriate solvent, if desired, to remove the organic reaction products. The volatile materials are then separated by fractional distillation at ordinary or reduced pressure.

The polyfluoroazoalkanes are yellow-green liquids characterized by good heat stability and resistance to hydrolysis by 10% aqueous sodium hydroxide solution up to at least 100° C. The N-halo(fluoroalkylidene)imines and the N,N-dihalo(fluoroalkyl)amines are colorless or pale yellow liquids. They are rapidly hydrolyzed by 10% aqueous sodium hydroxide solution at 25° C. Because of the presence of active halogen, i.e., chlorine or bromine directly attached to nitrogen, they react with aqueous potassium iodide with evolution of iodine. Both types of compounds possess surprising heat stability in decided contrast to the non-fluorinated aliphatic N-halo amines, which are known to deflagrate violently on heating. The N-halo(fluoroalkylidene)imines are heat-stable over a wide temperature range. The N,N-dihalo(fluoroalkyl)-amines only show some tendency to slow, non-violent decomposition above about 125° C. Compounds of all three classes (polyfluoroazoalkanes, N-halo(fluoroalkylidene)imines, and N,N-dihalo(fluoroalkyl)amines) are essentially non-flammable, and they even retard combustion of flammable materials.

The invention is illustrated in greater detail in the following examples.

*Example I*

A mixture of 20 g. of trifluoroacetonitrile, $CF_3CN$, 75 g. of silver(I) fluoride (mole ratio $AgF/CF_3CN$ 2.8:1) and 35 g. of bromine was heated in a bomb under autogenous pressure at 100° C. for 1 hour, 150° C. for 1 hour and 190° C. for 2 hours. The volatile reaction product (30 g.) was distilled. The fraction boiling at 16–20° C. (13 g.) was found by mass spectroscopy analysis to contain on a molar basis, 90% of azoperfluoroethane, $C_2F_5N=NC_2F_5$, 3–8% of N-bromo(perfluoroethylidene)imine, $CF_3—CF=NBr$, and 1% of bromopentafluoroethane, $C_2F_5Br$. The residue in the still (6 g.) was found by infrared analysis to contain 75 mole percent of azoperfluoroethane. The conversion to azoperfluoroethane was 60% and to $CF_3—CF=NBr$ 1%.

Azoperfluoroethane, as obtained from this and other preparations is a yellow-green liquid boiling at 18–20° C. at 760 mm.

*Example II*

A mixture of 20 g. of trifluoroacetonitrile, 75 g. of silver(I) fluoride and 15 g. of chlorine was heated under autogenous pressure at 100° C. for 6 hours. Distillation of the volatile product (29 g.) gave a first fraction (9 g.) boiling from —68 to +9° C., which was shown by mass spectroscopy to contain, on a molar basis, 90% of trifluoroacetonitrile, 3–10% of N-chloro(perfluoroethylidene)imine, $CF_3—CF=NCl$, and a trace of chloropentafluoroethane. A second fraction (14 g.), B.P. 8.5–20.5° C., contained 72–74 mole percent of azoperfluoroethane, 5–18 mol percent of $CF_3CF=NCl$ and 2–3 mole percent of $CF_3CN$. The conversion to azoperfluoroethane was 45%, and to N-chloro(perfluoroethylidene)imine about 5%. The latter, as obtained in this and other preparations, is a very pale yellow liquid boiling between 5 and 7° C. at 760 mm. which contains active chlorine (calculated, 23.7% active chlorine; found, 22.9%).

*Example III*

A reactant mixture essentially identical with that of Example II was maintained at 25° C. for 2.5 days in a bomb at autogenous pressure. The volatile reaction product (36 g.) was found to contain azoperfluoroethane, N-chloro(perfluoroethylidene)imine, and N,N-dichloro-(perfluoroethyl)amine, all in small amounts.

*Example IV*

The reactants of Example II, but in different proportions (16 g. $CF_3CN$, 30 g. AgF, 13 g. chlorine; mole ratio $AgF/CF_3CN$ 1.4:1) were heated under autogenous pressure at 100° C. for 1 hour and 160° C. for 2 hours. The volatile reaction product (27 g.) contained azoperfluoroethane (43% conversion) $CF_3—CF=NCl$ (14% conversion) and a compound which may be $CF_3CCl=NCl$ (10% conversion).

*Example V*

A mixture of 43 g. of trifluoroacetonitrile, 100 g. of potassium fluoride (mole ratio $KF/CF_3CN$ 3.8:1) and 19 g. of chlorine was heated under autogenous pressure at 100° C. for 1 hour, 150° C. for 1 hour and 200° C. for 6 hours. Distillation of the volatile reaction product (58 g.) gave first a 44 g. fraction boiling between —62° and —10° C., which infrared analysis showed to contain, on a molar basis, 60–65% $CF_3CN$, about 5% each of $CF_3—CF=NCl$ and $C_2F_5N=NC_2F_5$, chlorine and a trace of $C_2F_5Cl$; then 10 g. of product boiling in part between —8.5 and +5° C. with some higher boiling material. This fraction contained 50 mole percent of $CF_3—CF=NCl$ and 50 mole percent of $C_2F_5N=NC_2F_5$.

*Example VI*

A mixture of 19 g. of trifluoroacetonitrile, 30 g. of sodium fluoride and 14 g. of chlorine was heated under autogenous pressure at 50° C. for 1 hour, 100° C. for 1 hour, 150° C. for 1 hour, and 235° C. for 4 hours. The volatile reaction product (41 g.) contained much unchanged $CF_3CN$, but infrared analysis showed the presence of a small amount of $CF_3-CF=NCl$.

Example VII

A mixture of 25 g. of trifluoroacetonitrile, 120 g. of cesium fluoride (mole ratio $CsF/CF_3CN$ 3:1) and 42 g. of bromine was heated under autogenous pressure at 100° C. for 1 hour, 150° C. for 1 hour, and 190° C. for 2 hours. Distillation of the volatile reaction product (30 g.) gave 21 g. of a fraction, B.P. 12–19° C., which was shown by mass spectroscopy and infrared analysis to contain 70–80 mole percent of $C_2F_5N=NC_2F_5$, 20 mole percent of $CF_3-CF=NBr$, and small amounts of bromotrifluoromethane and bromopentafluoroethane. The conversion to $C_2F_5N=NC_2F_5$ was about 50%, and to $CF_3-CF=NBr$ about 7%.

Example VIII

A mixture of 25 g. of trifluoroacetonitrile, 160 g. of mercury(II) fluoride (mole ratio $HgF_2/CF_3CN$ 5:1) and 19 g. of chlorine was heated under autogenous pressure at 100° C. for 1 hour, 150° C. for 1 hour, and 190° C. for 2 hours. The volatile reaction product (30 g.) was found by infrared analysis to contain $C_2F_5N=NC_2F_5$ in amount corresponding to about 50% conversion and $$CF_3-CF=NCl$$

in amount corresponding to about 20% conversion.

Similar results were obtained when chlorine was replaced by bromine under essentially similar conditions.

Example IX

A mixture of 36 g. of trifluoroacetonitrile, 195 g. of lead(II) fluoride (mole ratio $PbF_2/CF_3CN$ 4:1) and 19 g. of chlorine was heated at 100° C. for 1 hour, 150° C. for 1 hour, and 200° C. for 6 hours under autogenous pressure. Distillation of the volatile reaction product (47 g.) gave, besides a fraction consisting chiefly of unchanged $CF_3CN$ and chlorine, 8 g. of a fraction boiling between −2.5 and +5° C., containing 90 mole percent of $CF_3-CF=NCl$, as shown by mass spectroscopy and infrared analysis; and 4 g. of residue containing 65–70 mole percent of $CF_3-CF=NCl$, a small amount of

$$C_2F_5N=NC_2F_5$$

and a compound believed to be $CF_3CCl=NCl$. The conversion to $CF_3-CF=NCl$ was about 18%.

Example X

A mixture of 30 g. of perfluoropropionitrile, $C_2F_5CN$, 75 g. of silver(I) fluoride and 40 g. of bromine was heated at 100° C. for 1 hour, then at 160° C. for 3 hours under autogenous pressure. Distillation of the volatile reaction product gave 8 g. of yellow-green liquid, B.P. 68–71° C., which was shown by nuclear magnetic resonance and elemental analysis to be azoperfluoropropane, $$C_3F_7N=NC_3F_7$$

*Analysis.*—Calc'd for $C_6F_{14}N_2$: C, 19.67; F, 72.68; N, 7.65. Found: C, 19.90; F, 71.93; N, 8.03.

There was also obtained 1 g. of N-bromo(perfluoropropylidene)imine, $C_2F_5-CF=NBr$, B.P. 55–61° C.

Example XI

A mixture of 30 g. of perfluoropropionitrile, 80 g. of silver(I) fluoride and 12 g. of chlorine was heated under autogenous pressure at 50° C. for 1 hour and 75° C. for 3 hours. Distillation of the volatile reaction product (39 g.) gave, besides unchanged $C_2F_5CN$ and chlorine, 6 g. (15% conversion) of N-chloro(perfluoropropylidene)-imine, $C_2F_5-CF=NCl$, as a pale yellow liquid boiling at 33–36° C., which was identified by infrared and nuclear magnetic resonance analysis; and 8 g. (21% conversion) of azoperfluoropropane.

Example XII

A mixture of 30 g. of perfluorobutyronitrile, 40 g. of silver(I) fluoride (mole ratio $AgF/C_3F_7CN$ 2:1) and 20 g. of bromine was heated at 100° C. for 1 hour and 160° C. for 2 hours under autogenous pressure. Distillation of the volatile reaction product gave 8 g. (18% conversion) of N-bromo-perfluorobutylidene)imine, $C_3F_7-CF=NBr$, B.P. 75–77° C.; and 9 g. (25% conversion) of azoperfluorobutane, $C_4F_9N=NC_4F_9$, B.P. 100–112° C.

These products, as obtained in another preparation, were identified by nuclear magnetic resonance and elemental analysis. N-bromo(perfluorobutylidene)imine is a light yellow liquid boiling at 74° C. at 760 mm.

*Analysis.*—Calc'd For $C_4F_8BrN$: C, 16.32; F, 51.70; Br, 27.20; N, 4.76; active Br, 27.20. Found: C, 17.18; F, 53.42; Br, 26.62; N, 4.76; active Br, 24.62.

Azoperfluorobutane is a yellow-green liquid boiling at 113° C. at 760 mm.

*Analysis.*—Calc'd for $C_8F_{18}N_2$: F, 73.40. Found: F, 72.76.

When this experiment was repeated, but with different proportions of reactants (50 g. $C_3F_6CN$, 98 g. AgF, 50 g. $Br_2$, mole ratio $AgF/C_3F_7CN$ 3:1), azoperfluorobutane was the principal reaction product (84% conversion).

Example XIII

A mixture of 18.5 g. of perfluorobutyronitrile, 20 g. of silver(I) fluoride (mole ratio $AgF/C_3F_7CN$ 1.6:1) and 7 g. of chlorine was heated at 100° C. for 1 hour and 160° C. for 2 hours under autogenous pressure. This preparation gave azoperfluorobutane in 5% conversion and N-chloro - (perfluorobutylidene)imine. $C_3F_7-CF=NCl$, B.P. 55–58° C., in 4% conversion.

Example XIV

A mixture of 25 g. of perfluorobutyronitrile, 65 g. of lead(II) fluoride (mole ratio $PbF_2/C_3F_7CN$ 4:1) and 9 g. of chlorine was heated under autogenous pressure at 100° C. for 1 hour, 150° C. for 1 hour and 200° C. for 2 hours. Distillation of the volatile reaction product (34 g.) gave, after removal of the unchanged $C_3F_7CN$ and chlorine, 4 g. of a colorless liquid boiling at 55° C. This was identified as N-chloro(perfluorobutylidene)imine, $C_3F_7-CF=NCl$, by infrared, nuclear magnetic resonance and elemental analysis.

*Analysis.*—Calc'd for $C_4F_8ClN$: C, 19.24; F, 61.00; Cl, 14.23; active Cl, 14.23. Found: C, 20.20; F, 60.42; Cl, 13.60; active Cl. 12.25.

Example XV

The starting material in this example was perfluorooctanenitrile, $C_7F_{15}CN$, prepared by heating with phosphoric anhydride the ammonium salt of perfluorooctanoic acid. The acid itself was a commercial sample containing approximately 70% of $CF_3(CF_2)_6COOH$, the remainder consisting of a mixture of the isomeric acids

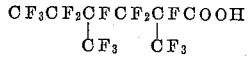

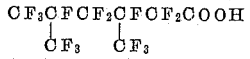

and

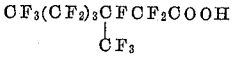

A mixture of 28 g. of perfluorooctanenitrile, 81 g. of silver(I) fluoride and 5 g. of chlorine was heated under autogenous pressure at 100° C. for 1 hour, then at 140° C. for 2 hours. The total reaction product was removed from the bomb and heated at 155° C. under 0.35 mm. pressure to recover the volatile material. There was thus obtained 22 g. of a liquid which solidified to a low melting solid. Redistillation of this product gave 20 g. (65% conversion) of a yellow-green, low melting solid boiling at 67–75° C. at 0.2 mm. pressure, which was shown by elemental analysis to be azoperfluorooctane, $$C_8F_{17}N\!=\!NC_8F_{17}$$

*Analysis.*—Calc'd. for $C_{16}F_{34}N_2$: C, 22.17; F, 74.60. Found: C, 22.31; F, 74.50.

Example XVI

A mixture of 18 g. of 2,2,3,3-tetrafluoropropanenitrile, $HCF_2CF_2CN$, 60 g. of silver(I) fluoride and 11 g. of chlorine was heated at 75° C. for 1 hour and 125° C. for 1 hour under autogenous pressure. The total reaction mass was removed from the bomb and heated at 150° C. under 0.15 mm. pressure to recover the volatile reaction product. Distillation of the latter gave 2 g. of a fraction (I) boiling at 58° C. at 760 mm. and 10 g. of a fraction (II) boiling at 106–108° C. at 760 mm.

Fraction (I) was identified by nuclear magnetic resonance and elemental analysis as N-chloro(ω-hydroperfluoropropylidene)imine, $HCF_2CF_2\!-\!CF\!=\!NCl$, obtained in 8% conversion.

*Analysis.*—Calc'd. for $C_3HF_5ClN$: F, 52.30; Cl, 19.60. Found: F, 52.49; Cl, 18.85

Fraction (II) was identified in the same manner as azo(ω-hydroperfluoropropane), $H(CF_2)_3N\!=\!N(CF_2)_3H$, obtained in 43% conversion

*Analysis.*—Calc'd. for $C_6H_2F_{12}N_2$: F, 69.09; N, 8.49. Found: F, 68.83; N, 8.73.

Example XVII

A mixture of 39 g. of ω-hydroperfluoropentanenitrile, $H(CF_2)_4CN$, 60 g. of silver(I) fluoride and 12 g. of chlorine was heated under autogenous pressure at 75° C. for 1 hour and 125° C. for 1 hour. A 17 g. liquid portion was removed from the total reaction product, and another 18 g. portion of liquid reaction product was recovered by heating the solids at 125° C. under 1–2 mm. pressure. Distillation of the combined liquids gave 11 g. of a fraction (I), a colorless liquid boiling at 100–102° C. at 760 mm., and 17 g. of a fraction (II), a yellow liquid boiling at 85–86° C. at 28 mm.

Fraction (I) was identified by nuclear magnetic resonance and elemental analysis as N-chloro(ω-hydroperfluoropentylidene)imine, $H(CF_2)_4CF\!=\!NCl$, obtained in 23% conversion.

*Analysis.*—Calc'd for $C_5HF_9ClN$: F, 60.75; Cl, 12.61; active Cl, 12.61. Found: F, 60.54; Cl, 12.76; active Cl, 12.15.

Fraction (II) was identified in the same manner as azo(ω-hydroperfluoropentane), $H(CF_2)_5N\!=\!N(CF_2)_5H$, obtained in 37% conversion.

*Analysis.*—Calc'd for $C_{10}H_2F_{20}N_2$: F, 71.70. Found: F, 71.55.

The following examples illustrate the preparation of reaction products containing N,N-dihalo(fluoroalkyl)-amines.

Example XVIII

A mixture of 35 g. of trifluoroacetonitrile, 100 g. of silver(I) fluoride and 65 g. of chlorine was heated under autogenous pressure at 50° C. for 1 hour and 75° C. for 2 hours. The volatile products (97 g.) were distilled to remove unreacted trifluoroacetonitrile and chlorine. There was left 9 g. (12% conversion) of a yellow liquid which was shown by infrared and nuclear magnetic resonance analysis to be N,N-dichloro(perfluoroethyl)amine, $CF_3CF_2NCl_2$.

The same compound was also prepared by reaction of hydrogen fluoride with N-chloro(perfluoroethylidene)-imine, $CF_3CF\!=\!NCl$, as follows: A mixture of 5 g. of hydrogen fluoride and 12 g. of N-chloro(perfluoroethylidene)imine was heated under autogenous pressure at 75° C. for 1 hour. There was recovered 4 g. of a yellow liquid which distilled mainly at 42–44° C., and 5 g. of an unidentified, less volatile liquid which attacked glass rapidly. The fraction boiling at 42–44° C. was shown to be N,N-dichloro(perfluoroethyl)amine by elemental analysis and mass spectrometric analysis.

*Analysis.*—Calc'd for $C_2F_5Cl_2N$: F, 46.57; Cl, 34.80; active Cl, 34.80. Found: F, 47.17; Cl, 33.62; active Cl, 33.25.

The infrared and nuclear magnetic resonance spectra of this compound were similar to those of the compound obtained by reaction of trifluoroacetonitrile with silver fluoride and chlorine.

Example XIX

Two mixtures, the first one consisting of 44 g. of perfluoropropionitrile, 80 g. of silver(I) fluoride and 21 g. of chlorine and the second one consisting of 50 g. of perfluoropropionitrile, 110 g. of silver(I) fluoride and 25 g. of chlorine, were separately heated under autogenous pressure at 50° C. for 1 hour and 75° C. for 3 hours, and the volatile reaction products were combined. Distillation of this material gave first much unreacted chlorine and perfluoropropionitrile. Fractionation of the residue gave the following fractions:

(1) 3 g., B.P. 30–37° C.
(2) 9 g., B.P. 42–66° C.
(3) 3 g., B.P. 69–70° C.
(4) 23 g., B.P. 70–72° C.

Infrared and nuclear magnetic resonance analyses and active chlorine determination showed that fraction 1 was essentially pure N-chloro(perfluoropropylidene)imine, $C_2F_5CF\!=\!NCl$; fraction 2 contained 65–70% of $$C_2F_5CF\!=\!NCl$$

and 30–35% of N,N-dichloro(perfluoropropyl)amine, $C_2F_5CF_2NCl_2$; fraction 3 contained 41% of $C_2F_5CF_2NCl_2$ and 59% of azoperfluoropropane, $C_3F_7N\!=\!NC_3F_7$; and fraction 4 contained 73% of $C_3F_7N\!=\!NC_3F_7$ and 27% of $C_2F_5CF_2NCl_2$.

In a similar experiment in which 56 g. of perfluoropropionitrile, 135 g. of silver(I) fluoride and 25 g. of chlorine were heated at 100° C. for 1 hour, then at 140° C. for 2 hours, the same three reaction products were identified by spectral analysis, but the amount of N,N-dichloro(perfluoropropyl)amine present was much smaller.

N,N-dichloro(perfluoropropyl)amine was also prepared by reaction of hydrogen fluoride with N-chloro(perfluoropropylidene)imine. A mixture of 6 g. of hydrogen fluoride and 12 g. of N-chloro(perfluoropropylidene)imine was heated under autogenous pressure at 75° C. for 2 hours. Distillation of the reaction product gave a small fraction, B.P. 56–61° C., which was shown by nuclear magnetic resonance analysis to contain 45–50% of $C_3F_7NCl_2$, 40% of $C_2F_5CF\!=\!NCl$ and 5–10% of $C_3F_7N\!=\!NC_3F_7$.

Example XX

A mixture of 33 g. of perfluorobutyronitrile, 75 g. of silver(I) fluoride and 30 g. of chlorine was heated under autogenous pressure at 50° C. for 1 hour and 75° C. for 3 hours. The non-gaseous reaction product consisted of 29 g. of a yellow liquid which, on distillation, gave the following principal fractions:

(1) 0.73 g., B.P. 44–60° C.
(2) 2.78 g., B.P. 90–99° C.
(3) 8.20 g., B.P. 114–115° C.

Nuclear magnetic resonance analysis and active chlorine determination showed that fraction 1 was essentially N-chloro(perfluorobutylidene)imine, $C_3F_7CF\!=\!NCl$; fraction 2 was chiefly N,N-dichloro(perfluorobutyl)amine, $C_4F_9NCl_2$, with small amounts of another material, probably azoperfluorobutane; and fraction 3 was pure azoperfluorobutane, $C_4F_9N\!=\!NC_4F_9$.

Example XXI

A mixture of 38 g. of 2,2,3,3-tetrafluoropropanenitrile, $HCF_2CF_2CN$, 75 g. of silver(I) fluoride and 25 g. of chlorine was heated under autogenous pressure at 75° C. for 1 hour and 125° C. for 1 hour. There was obtained 36 g. of yellow liquid reaction product which, on distillation, gave the following principal fractions:

(1) 6 g., B.P. 52–56° C.
(2) 2.5 g., B.P. 86–103° C.
(3) 16 g., B.P. 105–107° C.

Nuclear magnetic resonance analysis showed that fraction 1 was essentially N-chloro(ω-hydroperfluoropropylidene)imine, $HCF_2CF_2CF=NCl$; fraction 2 was mostly azo(ω-hydroperfluoropropane), $H(CF_2)_3N=N(CF_2)_3H$, but it also contained minor amounts of N,N-dichloro(ω-hydroperfluoropropyl)amine, $H(CF_2)_3NCl_2$, whose presence was further shown by the fact that this fraction contained active chlorine; and fraction 3 was pure azo(ω-hydroperfluoropropane).

While the process of this invention has been illustrated with reference to the use of certain specific polyfluoronitriles, it is generally applicable to the treatment of nitriles of the formula X—R—CN, wherein X is hydrogen or fluorine and R is a divalent perfluoroalkyl radical. Thus, in addition to the polyfluoronitriles used in the foregoing examples, other polyfluoronitriles suitable for use in this process include, for example, perfluoroisobutyronitrile, $(CF_3)_2CFCN$; perfluorohexanenitrile, $CF_3(CF_2)_4CN$; ω-hydroperfluorononanenitrile, $H(CF_2)_8CN$ perfluorodecanenitrile, $CF_3(CF_2)_8CN$; ω-hydroperfluorotridecanenitrile, $H(CF_2)_{12}CN$; and the like. The most readily accessible among the polyfluoronitriles of the formula X—R—CN as defined above, and therefore preferred for use in this process, are those in which the perfluorocarbon radical R has from 1 to 12 carbon atoms. The most useful starting materials, because they lead to liquid, i.e., non-gaseous, polyfluoroazoalkanes are the polyfluoronitriles in which the radical attached to the nitrile group has at least two carbon atoms.

New polyfluoroazoalkanes made available by this invention are those, of the formula

X—R—CF$_2$—N=N—CF$_2$—R—X where X is hydrogen or fluorine and R is a divalent perfluoroalkyl radical. In addition to the compounds illustrated in the foregoing examples, these new polyfluoroazoalkanes include, as further examples, the following, which correspond to the nitriles listed above:
azo(perfluoroisobutane), $(CF_3)_2CFCF_2N=NCF_2CF(CF_3)_2$ azo(perfluorohexane), $CF_3(CF_2)_5N=N(CF_2)_5CF_3$; azo-(ω-hydroperfluorononane), $H(CF_2)_9N=N(CF_2)_9H$; azo-(perfluorodecane), $CF_3(CF_2)_9N=N(CF_2)_9CF_3$; azo(ω-hydroperfluorotridecane), $H(CF_2)_{13}N=N(CF_2)_{13}H$; and the like. The most readily accessible, and therefore preferred, of these new products, are those in which the perfluoroalkylene radical R has from 1 to 12 carbon atoms. The most useful by far of these products, for the reason that they boil above about 70° C. and are therefore suitable for many applications for which gaseous products such as $CF_3N=NCF_3$ are totally unsuitable, are those which contain at least six carbon atoms.

As illustrated in the above discussion and examples, N-halo(fluoroalkylidene)imines of the general formula X—R—CF=N—Hal., and N,N-dihalo(fluoroalkyl)-amines of the general formula X—R—CF$_2$—N(Hal.)$_2$, where R and X are as defined above and Hal. stands for chlorine or bromine, are generally obtained in varying amounts, together with the polyfluoroazoalkanes, in the process of this invention. In addition to the compounds illustrated in the foregoing examples, these new products include, as further examples, N-chloro(perfluoroisobutylidene)imine, $(CF_3)_2CFCF=NCl$ and N,N-dichloro(perfluoroisobutyl)amine, $(CF_3)_2CFCF_2NCl_2$ N-chloro(perfluorohexylidene)imine, $CF_3(CF_2)_4CF=NCl$ and N,N-dichloro(perfluorohexylamine, $CF_3(CF_2)_4CF_2NCl_2$ N-chloro(ω-hydroperfluorononylidene)imine, $H(CF_2)_8CF=NCl$ and N,N-dichloro(ω-hydroperfluorononyl)amine, $H(CF_2)_8CF_2NCl_2$ N-chloro(perfluorodecylidene)imine, $CF_3(CF_2)_8CF=NCl$ and N,N-dichloro(perfluorodecyl)amine, $CF_3(CF_2)_8CF_2NCl_2$ N-chloro-(ω-hydroperfluorotridecylidene)imine, $H(CF_2)_{12}CF=NCl$ and N,N-dichloro(ω-hydroperfluorotridecyl)amine, $H(CF_2)_{12}CF_2NCl_2$ and the like. It will be understood that, in the above examples, the halogen attached to the imino or amino nitrogen can be bromine instead of chlorine.

The polyfluoroazoalkanes made available by this invention are useful as initiators for the polymerization of unsaturated polymerizable materials, particularly fluoroolefins. For example, azo(perfluorobutane) and azo-(perfluorooctane) induce the polymerization of tetrafluoroethylene and hexafluoropropylene at 175–250° C. to polymers of good quality, and this catalytic effect is a general property of these new polyfluoroazoalkanes. Furthermore, they are also capable of initiating the polymerization of fluoroolefins at low temperature, e.g., 25° C. in the presence of ultraviolet light. The polyfluoroazoalkanes are further useful as intermediates in the preparation of valuable fluorinated compounds. Thus they can be converted, by reaction with chlorine or bromine, to the corresponding haloalkanes X—R—CF$_2$Cl or X—R—CF$_2$Br. The latter are known to have many uses per se, e.g., as fire-extinguishing agents, and as intermediates in the synthesis of many other valuable chemicals, for example through their ability to form Grignard reagents.

Another use for the liquid polyfluoroazoalkanes (i.e., for those boiling above about 70° C.) lies in their ability to act as stable solvents for polyfluorinated polymers. Thus, the liquid polyfluoroazoalkanes dissolve readily low-molecular weight polytetrafluoroethylene (M.P. 83–150° C.). The solutions so obtained can be applied to fibrous materials such as paper, fabrics, wood, etc. to give water-repellent coatings. Thus, for example, a solution of low molecular weight polytetrafluoroethylene in azoperfluorobutane imparts good water-repellency to paper dipped in this solution. Solutions of this kind form, on cooling, reversible gels or pastes. These gels can be used as "pipe dopes" or lubricating seals on valves, threaded pipes, etc.

The perfluoroazoalkanes of the invention are also useful for the production of the technically valuable perfluorocarbons and highly fluorinated hydrocarbons. Thus, when azoperfluorobutane, $C_4F_9N=NC_4F_9$, is heated in a bomb at 250° C. for 1 hour, then at 325° C. for 4 hours, it is essentially all decomposed, yielding perfluorooctane, $C_8F_{18}$, as the sole pyrolysis product. When azoperfluoroethane, $C_2F_5N=NC_2F_5$, is heated in a bomb at 250° C. for 12 hours, it gives perfluorobutane, $C_4F_{10}$, in about 13% conversion and perfluorotetraethylhydrazine, $(C_2F_5)_2N-N(C_2F_5)_2$, in about 25% conversion. This thermal behavior of the polyfluoroazoalkanes of at least four carbon atoms is in marked contrast with that of the first member of the series, hexafluoroazomethane. The latter, when heated in a bomb at 250° C. for 12 hours, i.e., under the identical conditions used with azoperfluoroethane, remains completely unchanged. When heated at 325° C. for 6 hours, only about half of the hexafluoroazomethane is decomposed. The pyrolysis product is chiefly (80%) perfluorotetramethylhydrazine, $$(CF_3)_2N-N(CF_3)_2$$

and no fluorocarbons are found.

The N-halo(fluoroalkylidene)imines also have technical uses. Because of their ready hydrolysis, they have toxic properties and are useful as fumigants and rodent killers. They are further useful as solvents for low-molecular weight polytetrafluoroethylene in the same manner as the polyfluoroazoalkanes. For example, the N-chloro(ω-hydroperfluoropentylidene)imine of Example XVII dissolves polytetrafluoroethylene (M.P. 83–150° C.) on warming to form a fluid solution which changes to a clear gel on cooling.

The N,N-dihalo(fluoroalkyl)amines, because of their similar property of ready hydrolysis, are also useful as agents for the control of lower forms of life. They are further useful as intermediates in the preparation of perhalogenated tertiary amines suitable for use as stable heat-transfer agents. Thus, N,N-dichloro(perfluoroalkyl)amines $RNCl_2$ where A is a perfluoroalkyl radical, react with perfluoroalkenes such as tetrafluoroethylene at 50–150° C. under autogenous pressure to give adducts of the type

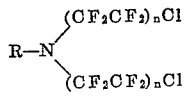

where $n$ is a number from 1 to 8 or even higher. These adducts are liquids or solids which have a neutral reaction and very good heat stability.

I claim:

1. A process for preparing compounds containing carbon, fluorine and nitrogen which comprises reacting under substantially anhydrous conditions a polyfluoronitrile of the formula X—R—CN wherein X is selected from the group consisting of hydrogen and fluorine and R is a perfluoroalkylene radical of 1–12 carbon atoms, with (1) a halogen of the group consisting of chlorine and bromine and (2) a metal fluoride of the group consisting of sodium, potassium, rubidium, cesium, copper, silver, mercury and lead fluorides at an elevated temperature, within the range of from about 25 to 250° C.

2. The process of claim 1 wherein the metal fluoride reactant is potassium fluoride, the halogen reactant is chlorine and the nitrile reactant is trifluoroacetonitrile.

3. The process of claim 1 wherein the metal fluoride reactant is silver fluoride, the halogen reactant is bromine and the nitrile reactant is perfluoropropionitrile.

4. A compound of a formula selected from the group consisting of

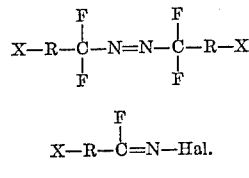

and

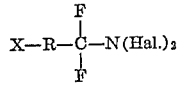

wherein X is selected from the group consisting of hydrogen and fluorine; R is a perfluoroalkylene radical of 1–12 carbon atoms; and Hal. is selected from the group consisting of chlorine and bromine.

5. A compound of the formula:

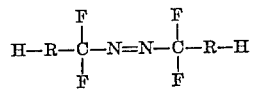

wherein R is a perfluoroalklene radical of 1–12 carbon atoms.

6. Azo(omega-hydroperfluoropropane).
7. Azo(omega-hydroperfluoropentane).
8. A compound of the formula:

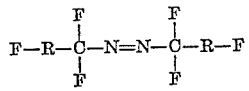

wherein R is a perfluoroalkylene radical of 1–12 carbon atoms.

9. Azoperfluoroethane.
10. Azoperfluoropropane.
11. Azoperfluorooctane.
12. Azoperfluorobutane.

References Cited in the file of this patent

Ruff: Ber. Deut. Chem., vol. A–69, page 193 (1936).
Ruff: Ber. Deut. Chem., vol. 69, pages 598, 603, 604, 684 (1936).
Guculo et al.: J. Am. Chem. Soc., 74, 710–713 (1952).
Gervasi et al.: J. Am. Chem. Soc., 78, 1679–1682 (1956).
Avonda et al.: J. Am. Chem. Soc., 78, 2798–2800 (1956).